Feb. 14, 1939. H. HIRSCH ET AL 2,146,895
BEER PIPE CLEANING APPARATUS
Filed April 16, 1938
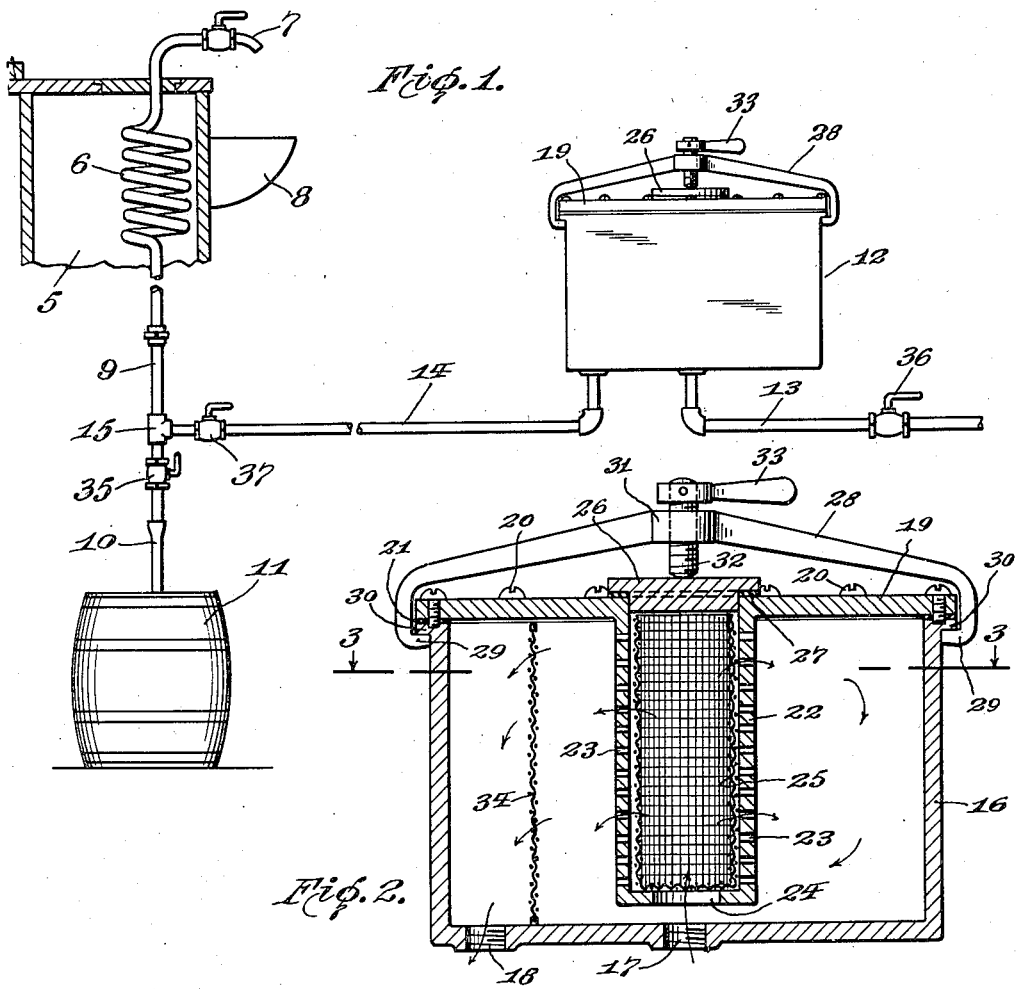
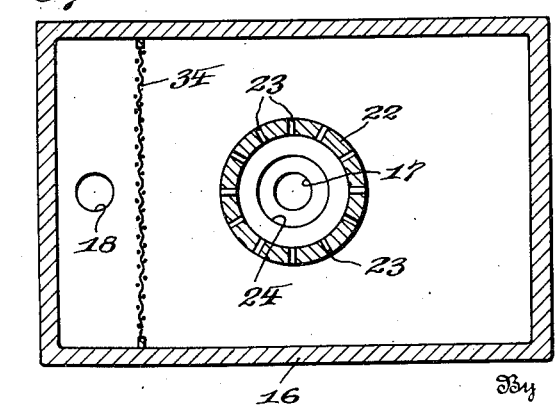
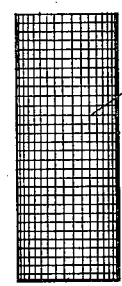
Inventors:
Henry Hirsch.
Samuel Englander
By Hartwell Balcom
Attorney Patented Feb. 14, 1939

2,146,895

UNITED STATES PATENT OFFICE 2,146,895

BEER PIPE CLEANING APPARATUS

Henry Hirsch and Samuel Englander, Jersey City, N. J.

Application April 16, 1938, Serial No. 202,563

2 Claims. (Cl. 225—12)

This invention relates to an apparatus for cleaning beer pipes and the improvements are directed to means, interposed between a source of water supply and the usual spigot or tap at a dispensing bar, whereby the coil and piping between the tap and the supply of beer may be scoured and cleaned of extraneous matter.

As is well known the coil and piping between said spigot and beer supply means becomes fouled with encrustations and accumulations ordinarily present in the beer and it is necessary at frequent intervals to remove this material in order to assure a clean and sanitary condition.

To this end an important object of the present invention resides in the provision of means that may be permanently coupled to the beer pipes and which may be operated at suitable intervals without dismantling the present structure.

Another object is to provide a mixing casing having a perforated well therein to receive a cleaning powder or chemical, said powder being positioned in the path of a stream of water whereby the same is dissolved and carried with said stream through the coil and beer piping of the dispensing apparatus.

Still another object of the invention is to provide a novel closure member which includes a perforated well, the latter supporting a strainer whereby only dissolved cleaning material is passed through the system.

A still further object is to provide a cup-shaped strainer, comprised of screening, and adapted to receive the cleaning powder, said strainer being removable to facilitate cleansing of the same.

The invention is further featured by the provision of unique means for maintaining the several parts in assembled relation.

Other features and advantages of the invention will hereinafter appear.

In the drawing:

Figure 1 is a view showing the apparatus connected to a beer dispensing system.

Fig. 2 is a central vertical longitudinal sectional view of the mixing casing detached from the system.

Fig. 3 is a horizontal sectional view taken on the line 3—3 of Fig. 2, with the cup-shaped strainer removed.

Fig. 4 is an elevation of the removable strainer.

In Figure 1 the numeral 5 denotes a portion of the usual beer dispensing bar that contains the usual cooling coil 6, the tubing leading therefrom being connected to the spigot or tap 7 positioned over the waste receptacle 8. The other end of said coil is connected to piping 9 leading to a hose 10, one end of the latter being in communication with the beer supply means in the form of keg 11. This structure is more or less conventional.

Our apparatus, which includes the chemical mixing casing, is coupled to the aforesaid system at any suitable point, as for instance in the cellar or similar place containing the supply of beer. This casing, denoted generally by the numeral 12 in Fig. 1, is connected to a water supply means through the intermediary of pipe 13, conduit 14 leading from said casing to the piping 9, the joining thereto being effected by the interposition of T-coupling 15 in said piping. In view of this arrangement the charge of water introduced into the casing and the dissolved cleaning chemical in the latter may be transported to the beer piping by operating the system in the manner appearing hereinafter.

As shown in Figs. 2 and 3 the chemical mixing casing comprises a body portion 16 having an inlet opening 17 to receive the water pipe 13 (see Fig. 1), and an outlet opening 18 in which is connected the conduit 14. Closure 19 is secured to the top of said body portion by means of screws 20, or the like, a gasket 21 being interposed to assure a water-tight connection. It will be noted said closure is provided with a depending well 22, the walls thereof being provided with perforations 23, whilst its bottom is apertured at 24 substantially directly over the inlet opening 17. Thus water entering at the inlet 17 passes to the well 22 and exits therefrom by way of perforations 23 and finally emerging through the opening 18.

As it is proposed to introduce a cleaning powder or chemical in the system, a removable strainer 25 is positioned in well 22 to contain this material, said strainer extending to the top of the well which is closed by a cap 26 that is clamped tightly therein, in view of gasket 27, by means of a bale 28, the hooked ends 29 thereof engaging beneath flanges 30 of the body portion 16, enlargement 31 threadedly receiving bolt 32 operated by handle 33 in an obvious manner. As shown in Fig. 2 a strainer partition 34 is mounted between the well 22 and the outlet 18 to stop the passage of any undissolved cleaning material to the conduit 14.

In the operation of the system the cleaning material having been placed in the strainer 25 and the parts assembled in the aforesaid manner, valve 35 in the beer pipe 9 is closed (see Fig. 1), and spigot 7 opened. Valves 36 and 37 in pipe 13 and conduit 14, respectively, are opened whereupon the water entering the inlet 17 rushes into the well to dissolve the cleaning material in strainer 25, said dissolved material passing through the strainer partition 34 to outlet 18, through conduit 14 and entering the piping 9 and coil 6 to discharge through the spigot 7. This operation is continued until the piping in the dispensing system is cleaned of the extraneous matter therein and as the cleaning material in the strainer is spent the flooding operation continues until a clear stream of water passes through spigot 7 to the waste receptacle 8. In order to clean the piping below valve 35 the latter is opened so the cleansing stream may be passed therebelow. In the event the dispensing bar includes a battery of beer pipes it is only necessary to connect the conduit 14 to each system in the well-known manner, valves being introduced to cut off the individual systems.

Our unique mode of construction permits easy cleansing of the apparatus, this operation being accomplished by removing the cap 26 after the clamping means has been released, whereupon the strainer 25 can be lifted out of the well 22 and cleansed of the crystallized residue that tends to clog the screening. This operation is simple and may be performed within a few minutes since further dismantling of the apparatus is not necessary. However, if it is desired to dismantle the complete apparatus the closure 19 and well 22 may be lifted from the body portion by removing the screws 20, and finally the screen partition 34 is removed.

Various slight changes might be made in the general form and arrangement of the parts described without departing from the invention, and hence we do not limit ourselves to the precise details set forth, but consider ourselves at liberty to make such changes and alterations as fairly fall within the spirit and scope of the appended claims.

We claim:

1. A chemical mixing casing comprising a body portion having inlet and outlet openings, a closure therefor having a perforated well extended into said body portion, the bottom of said well having an aperture aligned with said inlet opening, a strainer removably positioned within said well to receive a cleaning material, and a cap sealing the top of said well, said well and strainer receiving a charge of water whereby the cleaning material is dissolved and passed to said outlet opening.

2. A removable closure for a chemical mixing casing having inlet and outlet openings, said closure having an integral perforated well extended into said casing, the bottom of said well having an aperture positioned above said inlet opening and aligned therewith, and a cap sealing the top of said well.

HENRY HIRSCH.
SAMUEL ENGLANDER.